United States Patent [19]
Yamamoto et al.

[11] 3,946,620
[45] Mar. 30, 1976

[54] GEAR WITH A TROCHOIDAL CURVED DISK

[75] Inventors: Kiichiro Yamamoto, Kawagoe; Shigeru Toyosumi, Obu, both of Japan

[73] Assignee: Sumitomo Shipbuilding & Machinery Co., Ltd., Tokyo, Japan

[22] Filed: Nov. 6, 1974

[21] Appl. No.: 521,545

[52] U.S. Cl. .................................................. 74/462
[51] Int. Cl.² ........................................ F16H 55/08
[58] Field of Search ............ 74/457, 460, 462, 351, 74/415

[56] References Cited
UNITED STATES PATENTS

| | | |
|---|---|---|
| 1,909,117 | 5/1933 | Pigott .................................. 74/462 |
| 2,222,515 | 11/1940 | Pigott .................................. 74/462 |

*Primary Examiner*—John J. Camby
*Attorney, Agent, or Firm*—Armstrong, Nikaido & Wegner

[57] ABSTRACT

A gear is provided with a trochoidal curved disk comprising a tooth profile modified by rotatably shifting a theoretical trochoidal tooth profile about the center of the gear by a phase angle of $\Delta \phi$ to provide a backlash.

2 Claims, 11 Drawing Figures

GEAR WITH A TROCHOIDAL CURVED DISK

BACKGROUND OF THE INVENTION

The present invention relates generally to a gear with a trochoidal curved disk and more particularly to a method for modifying the tooth profile thereof so that the theoretical mesh of the gears may be ensured.

In general, the theoretical tooth profile of a trochoidal gear such as a planet gear used in a planetary speed reducer is modified to provide a suitable amount of backlash. The actual tooth profile modified by the prior method is formed by cutting the theoretical trochoidal tooth profile in the normal direction by a distance equal to a desired amount of backlash. The actual tooth profile does not, therefore, represent the theoretical trochoids so that the inaccurate intermesh inevitably occurs between the cylindrical pin teeth of a sun gear and the teeth of the planet gear.

SUMMARY OF THE INVENTION

The present invention was made to overcome this problem. In order to provide the backlash, according to the present invention, the theoretical trochoidal tooth profile is rotated about the center of the gear over a predetermined phase angle in both clockwise and counter-clockwise directions so that two theoretical trochoidal tooth profiles, which are out of phase from the original trochoidal tooth profile by said predetermined angle, may be formed. The two trochoidal tooth profiles thus drawn are interconnected with each other in the vicinity of their crests and troughs by a smooth curve so that the ridge portions formed in the vincinity of said their intersections may be eliminated. Thus, the gear cutting and grinding may be facilitated, and the abnormal mesh due to the difference in machining tolerance and the elastic deformation may be completely prevented.

The present invention will become more apparent from the following description of one preferred embodiment thereof taken in conjunction with the accompanying drawings.

DESCRIPTION OF THE PREFERRED EMBODIMENTS

Figure 1:
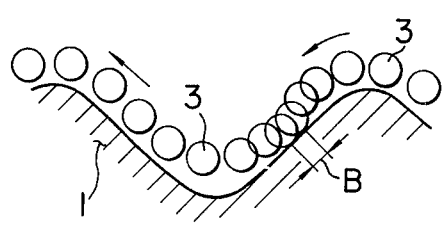
FIG. 1 is a view used for the explanation of the prior art method for modifying the trochoidal tooth profile.

Referring to FIG. 1, a dotted line 2 represents the theoretical trochoidal tooth profile of a planet gear 1 used in a planetary gear speed reducer; and 3 denotes cylindrical pin teeth of a sun gear in mesh with the planet gear 1. The actual tooth profile indicated by a full line 2' is formed inside the theoretical profile 2 and spaced apart therefrom by a distance $\delta$ in the normal direction, whereby the backlash is provided. As is clearly seen from FIG. 1, the actual tooth profile does not represent the theoretical profile so that the theoretical or complete mesh between the pins 3 and the teeth of the planet gear 1 cannot be attained, thus resulting in the incomplete or irregular mesh therebetween.

Figure 2:
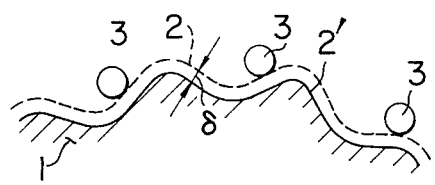
FIG. 2 is a view used for the explanation of the trochoidal tooth profile modification method in accordance with the present invention.

The present invention was made to overcome the above defect encountered in the prior tooth profile modification method. According to the present invention, as shown in Fig. 2, the theoretical profile 2 (indicated by a dotted line) is rotated about the center O of the planet gear 1 through $\Delta\phi$ in both the clockwise and counterclockwise directions so that two theoretical tooth profiles 2' and 2'', which are out of phase by $\Delta\phi$ relative to the original theoretical tooth profile 2, may be obtained. Both the tooth profiles 2' and 2'' are theoretical trochoidal tooth profiles intersecting each other at points in the vicinity of the crests and troughs at acute angles. In order to ensure smooth gear action, the two tooth profiles 2' and 2'' are connected to each other by smooth curved lines (as indicated by the dotted lines in Fig. 2) between the adjacent crests and troughs. Thus the tooth profile modified according to the present invention consists of the trochoids A except crests and troughs as shown in FIG. 2 so that the complete and theoretical mesh between the pin and the planet gear may be ensured.

Figure 3:
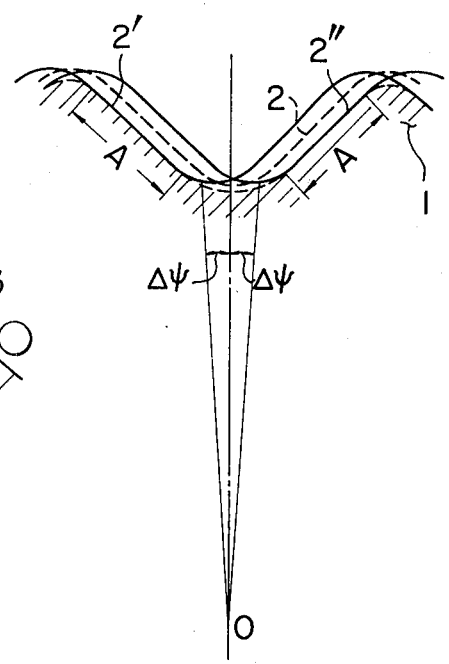
FIG. 3 is a view used for the explanation of the mesh between the cylindrical pin tooth and the teeth of the trochoidal planet gear in a prior speed reducer.
Figure 4:
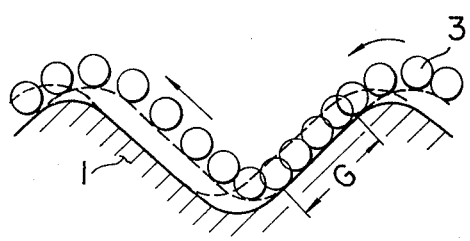
FIG. 4 is a view used for the explanation of the mesh between the pin tooth and the teeth of the trochoidal gear whose tooth profile is modified in accordance with the present invention.

Next referring to FIGS. 3 and 4, the advantages of the tooth profile modified in accordance with the present invention over the tooth profile modified by the prior method will be described. FIGS. 3 and 4 show the relative motion between the planet gear 1 and the pin 3 when the former is rotated in mesh with the latter. In FIG. 3 the tooth profile modified by the prior method is shown while, in FIG. 4, the tooth profile modified in accordance with the preesent invention is shown. Referring first to FIG. 3, the pin 3 does not tangentially approach toward the point of first contact with the tooth of the planet gear 1 so that the pin 3 hits against the tooth. The pin 3 is made into incomplete or non-theoretical mesh with the tooth of the planet gear 1 only over a very limited range B (theoretically, the pin 3 meshes with the teeth of planet gear 1 at a contact ratio substantially equivalent to one), and thereafter the pin 3 moves away from the tooth in a non-tangential direction. On the other hand, in FIG. 4, the pin 3 approaches tangentially toward the point of first contact with the tooth of the planet gear 1 and is made into complete or theoretical mesh or contact with the tooth over a wide range G. Moreover, the pin 3 moves away from the tooth in the tangential direction. Thus it is seen that the tooth profile modified in accordance with the present invention ensures the complete or thoretical mesh between the cylindrical pins of the sun gear and the teeth of the trochoidal planet gear 1. The theoretical mesh or contact range G may be optimumly selected by varying the phase angle $\Delta\phi$.

As described hereinbefore, according to the present invention, in order to provide the backlash the tooth profile may be so modified that the modified tooth profile may consist substantially the theoretical trochoids. Therefore, the theoretical mesh between the pins and the teeth may be ensured so that the smooth and quiet rotation may be ensured and the vibrations and noise may be considerably reduced. The complete and theoretical mesh between the pins and the teeth over the wide range may be ensured; the contact ratio may be considerably increased (the number of pins in contact with the teeth is also increased); and the contact pressure may be reduced, thus increasing the resistance against the injuries such as pitting.

As described before, the modified tooth profiles 2' and 2'' intersect each other in the vicinity of their crests and troughs. These small portions of the modified tooth profile in the vicinity of the intersections actually do not serve the intermesh between the pins and the teeth. Furthermore, if these portions are left as they are, it is apparent that the smooth gear action cannot be ensured. Moreover, in a case of employing a method for generating the teeth by the use of the grinding wheel, it is difficult to form the pointed edge in the grinding wheel. Therefore, according to the present invention, the tooth profiles 2' and 2'' are smoothly interconnected by curve and line segments in the vicinity of their intersections as will be described in detail hereinafter.

Figure 5:
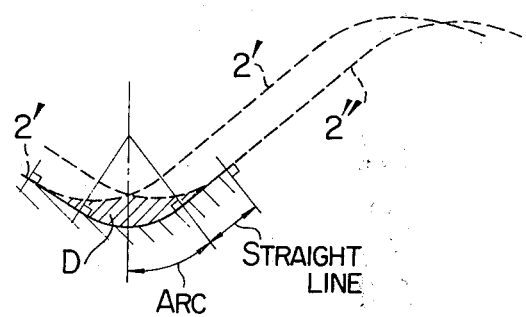
FIGS. 5, 6 and 7 are views illustrating various methods for connecting two trochoidal tooth profiles drawn in accordance with the present invention by a smooth curve in the vicinity of their troughs.

In FIG. 5, the tooth profiles 2' and 2'' are smoothly interconnected by line segments and one arc of a circle so that the ridge portion D formed at the intersection between the two tooth profiles 2' and 2'' in the vicinity of their troughs may be eliminated.

Figure 6:
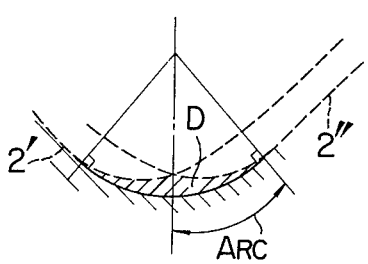
Figure 7:
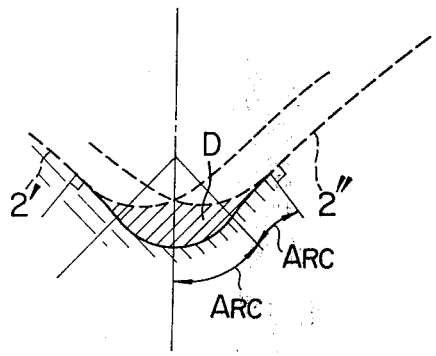

In like manner, in FIG. 6, the two tooth profiles 2' and 2'' are interconnected in the vicinity of their troughs by only one arc of a circle. In FIG. 7, the two tooth profiles 2' and 2'' are shown as being interconnected in the vicinity of their troughs by two arcs of circles with different radii.

In like manner, the two tooth profiles 2' and 2'' are connected with each other by a smooth curved line in the vicinity of their crests.

Figure 8:
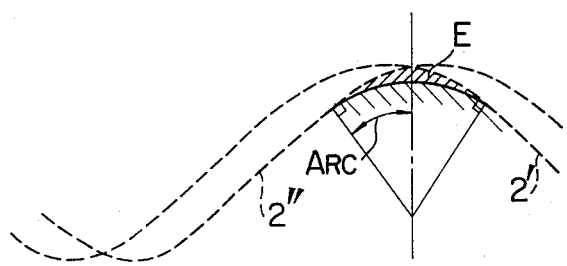
FIGS. 8, 9, 10 and 11 are views illustrating various methods for connecting said two trochoidal tooth profiles by a smooth curve in the vicinity of their crests.

In FIG. 8, the tooth profiles 2' and 2'' are smoothly interconnected by only one arc of a circle so that the ridge portion E at the crest may be eliminated.

Figure 9:
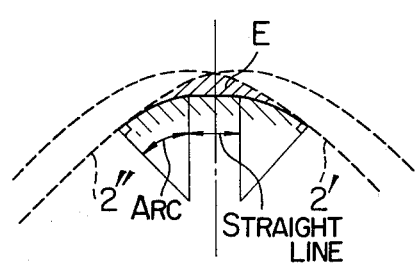
Figure 10:
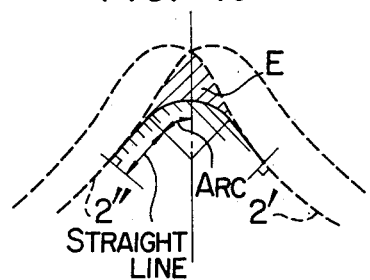
Figure 11:
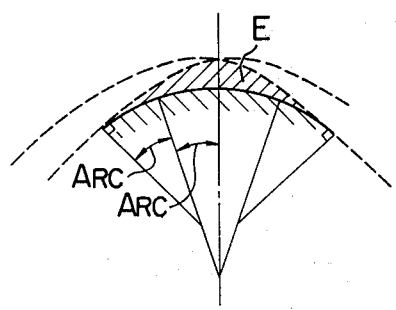

In FIG. 9, the two profiles 2' and 2'' are smoothly connected to each other by one line segment and two arcs of a circle. In FIG. 10, they are connected to each other by two line segments and one arc of a circle. In FIG. 11, they are connected to each other by two arcs of circles with different radii.

In addition to the above, any suitable combinations of line segments and arcs of circles of different radii may be used to interconnect the two tooth profiles 2' and 2'' in the vicinity of their crests and troughs. The shapes of curved lines used at the crests and troughs are dependent upon the length of the trochoids (indicated by $A$ in FIG. 2) desired and the backlash in the normal direction at the crests and troughs.

Since the trochoidal tooth profiles 2' and 2'' which are used for the modification of the trochoidal tooth profile, are interconnected by the smooth curved lines, cutting and grinding of the teeth may be much facilitated. Moreover, the backlash in the normal direction may be arbitrarily selected so that the abnormal mesh due to the machining tolerance, the elastic deformations and so on, may be positively prevented. Thus the load transmission efficiency as well as the service life of speed reducers may be considerably increased.

So far the present invention has been described as being applied to the planet gear of the planetary gear speed reducer, but it is to be understood that the present invention may be also applied to the cycloidal and trocoidal gears used in various hydraulic pumps and motors.

What is claimed is:

1. A gear with a trochoidal curved disk having a tooth profile, said tooth profile having a first portion, rotatably shifted from the theoretical trochoidal tooth profile about the center of the gear by a phase angle of $+\Delta\phi$ and a second portion rotatably shifted from the theoretical trochoidal tooth profile about the center of the gear by a phase angle $-\Delta\phi$, whereby backlash is provided.

2. A gear as set forth in claim 1, including continuous curves interconnecting said first and second portions at the crests and troughs of said modified tooth profile, whereby ridges produced at crests and troughs of said modified tooth profile are eliminated.

* * * * *

UNITED STATES PATENT OFFICE
CERTIFICATE OF CORRECTION

Patent No. 3,946,620   Dated   March 30, 1976

Inventor(s) KIICHIRO YAMAMOTO ET AL

It is certified that error appears in the above-identified patent and that said Letters Patent are hereby corrected as shown below:

On the first page, insert the following:

Foreign Application Priority Data

November 8, 1973   Japan............... 124918/73
November 8, 1973   Japan............... 124919/73

Signed and Sealed this

Tenth Day of August 1976

[SEAL]

Attest:

RUTH C. MASON
*Attesting Officer*

C. MARSHALL DANN
*Commissioner of Patents and Trademarks*